US005296156A

United States Patent [19]

Ploumen et al.

[11] Patent Number: 5,296,156

[45] Date of Patent: Mar. 22, 1994

[54] BLEACHING GRANULES

[75] Inventors: Jan J. H. Ploumen, WC Roermond; Herman J. Edelijn, GA Zwolle; Jan J. M. Reijnen, VH Utrecht, all of Netherlands

[73] Assignee: Akzo N.V., Netherlands

[21] Appl. No.: 722,985

[22] Filed: Jun. 28, 1991

Related U.S. Application Data

[63] Continuation-in-part of Ser. No. 436,994, Nov. 15, 1989, Pat. No. 5,049,298.

[30] Foreign Application Priority Data

Nov. 25, 1988 [EP] European Pat. Off. ........ 88202691.7

[51] Int. Cl.[5] ......................... C11D 7/54; C01B 15/00

[52] U.S. Cl. ................................ 252/95; 252/186.26; 252/186.25

[58] Field of Search .............................. 252/186.26, 95

[56] References Cited

U.S. PATENT DOCUMENTS

| | | | |
|---|---|---|---|
| 2,335,856 | 12/1943 | Hooft | 252/186.26 |
| 3,494,787 | 2/1970 | Lund et al. | 117/100 |
| 3,770,816 | 11/1973 | Nielsen | 252/186.25 |
| 4,091,544 | 5/1978 | Hutchins | 34/9 |
| 4,094,808 | 6/1978 | Stewart et al. | 252/186.26 |
| 4,170,453 | 10/1979 | Kitko | 8/111 |
| 4,225,451 | 9/1980 | McCrudden | 292/99 |
| 4,634,551 | 1/1987 | Burns et al. | 252/102 |
| 4,681,592 | 7/1987 | Hardy et al. | 8/111 |
| 4,681,695 | 7/1987 | Divo | 252/94 |
| 4,818,425 | 4/1989 | Meijer et al. | 252/94 |
| 4,865,759 | 9/1989 | Coyne et al. | 252/186.42 |
| 4,881,940 | 11/1989 | Massaux et al. | 8/111 |
| 4,917,811 | 4/1990 | Foster et al. | 252/95 |
| 4,919,836 | 4/1990 | Meijer et al. | 252/94 |
| 5,030,381 | 7/1991 | Zimmermann et al. | 252/186.26 |
| 5,049,298 | 9/1991 | Ploumen et al. | 252/95 |
| 5,089,167 | 2/1992 | Coyne et al. | 252/186.26 |
| 5,091,106 | 2/1992 | Jacobs et al. | 252/186.76 |

FOREIGN PATENT DOCUMENTS

| | | |
|---|---|---|
| 0160342 | 4/1985 | European Pat. Off. . |
| 0176124 | 9/1985 | European Pat. Off. . |
| 200163 | 5/1986 | European Pat. Off. . |
| 254331 | 5/1987 | European Pat. Off. . |
| 0267175 | 10/1987 | European Pat. Off. . |
| 363329 | 9/1962 | Switzerland . |
| 1456591 | 3/1973 | United Kingdom . |
| 1535804 | 3/1975 | United Kingdom . |

OTHER PUBLICATIONS

Reinhardt & Gethoffer, "TAED and New Peroxycarboxylic Acids as Highly Efficient Bleach Systems", presented at the 80th AOCS meeting in Cincinnati in May, 1989.

Abstract: European Patent Publication No. 200163, pub. 1986.

*Primary Examiner*—Richard D. Lovering
*Assistant Examiner*—Joseph D. Anthony
*Attorney, Agent, or Firm*—Ralph J. Mancini; David H. Vickrey; Louis A. Morris

[57] ABSTRACT

The invention relates to bleaching granules containing a solid, water-insoluble peroxy acid and a hydratable inorganic material. The bleaching granules are made by a process wherein the constituents to be used are mixed to form a powder at low temperature and granules are formed from the powder as the temperature is increased to at least the hydration temperature of the hydratable inorganic material. The invention also relates to bleaching compositions and detergent compositions comprised of such bleaching granules.

9 Claims, No Drawings

BLEACHING GRANULES

This is a continuation-in-part of parent application Ser. No. 07/436,994 filed Nov. 15, 1989, now U.S. Pat. No. 5,049,298.

BACKGROUND OF THE INVENTION

The invention relates to bleaching granules contain water-insoluble organic peroxy acid, a hydratable inorganic material, and, optionally, a water-insoluble organic compound and a surface-active compound. The bleaching agents according to the invention may be used alone or as additives in all the usual fields of application for bleaching agents. Preferably, they are employed in detergent and bleaching compositions for textile laundering processes.

The chemical instability of the peroxy acid, which in the pure form is liable to exothermic decomposition, requires that special steps be taken for the preparation of bleaching granules. In addition to the chemical stability of the peroxy acid, which is enhanced by preparing bleaching granules to a level sufficient for prolonged storage, the bleaching granules, especially when used in the detergents industry, must be more or less dust-free, display a favourable solubility in water, and form free-flowing mixtures, preferably with a granule size distribution of about 0.1–5 mm.

A known method for stabilizing peroxy acids is the addition of a hydratable inorganic material which, by taking up the crystallization water at a temperature below the hydration temperature of the hydratable material, will protect the hydratable material from moisture, but will also, upon reaching critical temperatures for the decomposition of the peroxy acid, which are above the hydration temperature of the hydratable material, release hydration water and inhibit exothermic decomposition. On the other hand, the water content of the granules should not be too high, since this would affect the mechanical stability of the granules.

In U.S. Pat. No. 4,091,544 a process is described for the preparation of bleaching granules containing a non-hydratable peroxy acid material and a hydratable material, in which a water-wet, plastic composition is prepared at a temperature above the hydration temperature of the hydratable material. This composition is extruded into smaller units, which units are chilled, resulting in the hydration of the hydratable material, and then subjected to a subsequent drying step. The uptake of the hydration water by the hydratable material as a result of the rapid decrease in temperature leads to the fixation of the formed granules. This four-step process makes it possible to prepare stable, free-flowing bleaching granules. In actual practice, however, such a process is found to be very time-consuming and costly, since the successive steps of heating, size reduction, rapid chilling, and drying are energy intensive and different equipment is needed for each individual step. Moreover, the process requires a relatively large amount of water to form the plastic composition.

Described in EP-A-200 163 is another method for the preparation of bleaching granules which, in addition to a peroxy acid and a hydratable inorganic salt, contain an alkali-soluble organic polymer compound as granulation aid. For the preparation of the granules, granulation processes are mentioned which do not employ strong mechanical and thermal loads that might lead to decomposition of the peracid. The granulate may be prepared by accretion granulation in a mixing granulation process, in which the solid peracid or a peracid premix is premixed with the remaining constituents in a mixer, whereupon water or an aqueous solution of the granulation aid is introduced and stirred until the desired granule size distribution has been obtained. This mixing granulation process is carried out at a temperature in the range of ambient temperature to 45° C. However, there is no teaching of the temperature rise scheme of the present invention. If needed, there may be a subsequent drying step. The mechanical stability of the granules obtained by this process is attributed to the polymeric granulation aid.

The present invention has for its object to develop a cost and energy-saving process for the preparation of bleaching granules having a very low water content, which contain at least a water-insoluble organic peroxy acid compound and a hydratable material and which are mechanically stable, chemically stable and free-flowing. The granulates of the present invention do not need to include a polymeric granulation aid.

The bleaching granules prepared by the process according to the invention display excellent mechanical and chemical stability, prolonged storage stability and enhanced water solubility. They also are dust-free, have a low water content, and exhibit a controllable granule size distribution. The bleaching granules prepared by the process according to the invention have higher densities than the known bleaching granules, a characteristic which is becoming increasingly important to the detergent and bleaching agent industries.

The favourable mechanical stability of the granules obtained according to the invention is highly surprising in that in the present process, since neither of the polymeric granulation aid according to EP-A-200 163 nor the rapid chilling step in accordance with U.S. Pat. No. 4 091 544 is necessary.

Drying steps may either be omitted or, optionally, such drying process may be employed if low water content bleaching granules are needed. The mechanical stability of the granules is also of advantage here due to restricted attrition and a higher product yield during the drying process.

SUMMARY OF THE INVENTION

The bleaching granules of the present invention are achieved by a novel process. That process comprises the steps of mixing a water-insoluble organic peroxy acid and a hydratable inorganic material at a total water content which is below the maximum hydration water content of the hydratable inorganic material and at a temperature below the hydration temperature of the hydratable inorganic material, until a powder is formed, heating said powder to at least the hydration temperature, and subsequently forming said heated powder into granules.

DETAILED DESCRIPTION OF THE INVENTION

The preparation of the bleaching granules according to the invention is as follows: the solid organic peracid, preferably an agglomerate of the organic peracid, and a water-insoluble compound and, optionally, a surface-active substance in the form of a filter cake or centrifuge cake, is introduced into a reaction vessel, for instance, a high-shear mixer, and processed into a homogeneous mass. The water content is determined by the addition of water to the solid peracid constituent or by the proportion of water in the filter cake or the centrifuge cake.

After the addition of the anhydrous or substantially water-free hydra- table material, intermixing takes place at a temperature below the hydration temperature of the hydratable material. For example, when use is made of sodium sulphate as the hydratable material, which has a hydration temperature of 32.5° C., intermixing generally takes place in the range of ambient temperature to 30° C. During this mixing process the hydratable material is formed into a crumbly, dry, free-flowing powder as a result of the uptake of water.

Next, the temperature of the feed is raised to at least the hydration temperature of the hydratable material. As a result of the temperature elevation, hydration water of the hydratable material is evolved and the crumbly powder in the presence of the water of hydration is formed into the granules according to the invention. The temperature may exceed the hydration temperature of the hydratable material by as much as 5° C. but, it is desirable to prevent such high temperatures since it creates a need for additional cooling at the end of the reaction.

The equipment is stopped upon the formation of granules. The precise moment for stopping the equipment can be determined and controlled by measuring the electric current consumed by the apparatus motor or by employing an impulse probe such as a DIOSNA-Boots mixing probe. When the equipment is not stopped at the proper time, the enlargement of the particles continues and may ultimately form a doughy mass. This situation can be cured, however, by the addition of a fresh portion $Na_2SO_4$. By further mixing the granules can be reformed in this manner. This granule reforming procedure is considered to be within the scope of the present invention.

The granule size distribution can be controlled by, among other things, the stirring rate of the mixer, the type of apparatus, and residence time in the mixer. Persons of ordinary skill in the art of granulation will be able to manipulate the particle size distribution by changing the mixing conditions in a known manner to thereby optimize the mixing conditions. The granule size distributed which is preferred will depend upon the particular application for which the peroxide granules are being fabricated. For example, the granule size distribution should be in the range of 0.1 to 5 mm, and more preferably 0.4–3 min, for use as bleaching granules in detergent compositions. The process of the present invention provides the ability to obtain a more narrow granule size distribution than previous processes.

As the granules already display mechanical stability after the granulation step, no rapid chilling step is required. By reducing the stirring rate after the granules have been formed, the bleaching granules can slowly, over a period of about 10–15 minutes, be cooled to ambient temperature.

Some uses of the bleaching granules may require a very narrow granule size distribution, which cannot be ensured solely by regulating the conditions of the granulate preparation. In such a case a sorting step, such as a screening step, may follow the preparation. Because of the very low water content of the bleaching granules (generally between 10 and 15% by weight) a subsequent drying step will be required only if extremely dry bleaching granules are desired.

Suitable for carrying out the process according to the invention are, for instance, mixers, extruders, and pelletizers. Mixers, more particularly high-shear mixers, are preferred since powder and granules can be formed in successive steps in one apparatus and the increase in temperature needed for forming granules does not require external heating, but rather, it is controlled by the generation of heat due to high-shear and the heat of hydration of the inorganic hydratable material. In general, both batchwise and continuous mixers may be used in the present process.

As examples of suitable batchwise operating high-shear mixers may be mentioned mixing granulators, such as:

"Dry Dispenser ®" (ex Baker Perkins, Peterborough, U.K.),
"Diosna Pharmamix ®" (ex Dierks, Osnabruck, FRG),
"Matrix ®" (ex Fielder Ltd., Eastleigh, U.K.),
"Bauermeister ®" (Fa. Ruberg, Paderborn, BRD),
"Ruberg hochleistungsmischer ®" (Fa. Ruberg, Paderborn, BRD),
"Gral Mixer/granulators ®" (Fa. Machines Collette, Wommelgem, BRD),
"MTI, Type EM ®" (ex MTI, Detmold, FRG), and
"Eirich Mixer ®" (ex Eirich, Hardheim, FRG).

As an example of a suitable continuous mixing apparatus may be mentioned the "Conax Durchlaufmischer ®" (Fa. Ruberg, Paterborn, BRD). As examples of suitable extruders may be mentioned Alma ®, Unika ®, Xtruder ®, and Werner Pfleiderer ®.

When extruders are used in the preparation of granules, there is generally no need for external heating. It is even recommended that the crumbly, dry powder used for granule forming be precooled, say to about 10° C., in order to avoid undesirably high temperatures during the extrusion process. Sufficient heat is generated by the mechanical work of extrusion in combination with the heat of hydration of the hydratable inorganic material.

As examples of suitable pelletizers may be mentioned those manufactured by Simon-Heesen. In addition, cylindrical segments may be reshaped into granules by a spheronization process in, for example, the Marumerizer ® (Ex. Russell Finex Ltd., London).

Another suitable apparatus for carrying out the present invention is a continuous fluid bed apparatus wherein successive stages at different temperature levels may be employed to carefully control the granulation process. This type of apparatus will generally require supplemental heating to produce the granulation temperatures of the present process.

The solid, water-insoluble organic peracids used according to the invention are known for instance from European Patent Applications 160 342, 176 124 and 267 175, from U.S. Pat. Nos. 4,681,592 and 4,634,551, from GB Patent Specification 1 535 804, and from "TAED and New Peroxycarboxylic Acids as Highly Efficient Bleach Systems", Reinhardt, G. and Gethoffer, H. , presented at the 80th AOCS meeting in Cincinnati in May, 1989.

The preferred peracid compounds are:

a) diperoxy acids, such as
  1,9-diperoxynonanedioic acid,
  1,12-diperoxydodecanedioic acid ("DPDA"), and
  1,13-diperoxytridecanedioic acid,
b) peroxy acids having an amide bond in the hydrocarbon chain, such as
  N-decanoyl-6-aminoperoxyhexanoic acid,
  N-dodecanoyl-6-aminoperoxyhexanoic acid,
  4-nonylamino-4-oxoperoxybutanoic acid ("NAPSA"), and 6-nonylamino-6-oxoperoxyhexanoic acid ("NAPAA"), c) alkyl-sulphonyl-peroxycarboxylic acid, such as
S-heptyl-sulphonyl-perpropionic acid,
S-octyl-sulphonyl-perpropionic acid,
S-nonyl-sulphonyl-perpropionic acid, and
S-decyl-sulphonyl-perpropionic acid, and d) perphthalimido alkanoic acids of the formula:

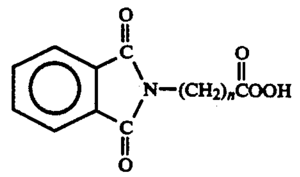

wherein n=1-20, such as 6-phthalimido peroxyhexanoic acid and 6-phthalimido peroxy decanoic acid.

Methods for the preparation of most of such compounds are known, inter alia, from the above-mentioned patent publications, and for the perphthalimido alkanoic acids a method of preparation is known from the publication, "TAED and New Peroxycarboxylic acids as Highly Efficient Bleach Systems", referred to herein; the disclosures of which is hereby incorporated by reference.

Since the pure peracid compound is difficult to handle, it is preferred in the preparative process according to the invention that use should be made of agglomerates composed of the peracid and an organic, water-insoluble compound, such as lauric acid, myristic acid, or mixtures thereof. A process for the preparation of such agglomerates is disclosed in, for instance, EP-A-254 331.

Furthermore, the agglomerates may contain surface-active materials from the group of commonly used anionic, nonionic, ampholytic, or zwitterionic surface-active substances.

Sodium dodecyl benzene sulphonate is a particularly preferred surface- active material.

As further constituents the agglomerates may contain compounds that are active as stabilizers and form complexes with metal ions, for instance phosphonates. A preferred compound is Dequest 2010®, hydroxyethylidene diphosphonic acid. Although not required for the mechanical stability of the granules according to the invention, the agglomerates may optionally also contain polymeric granulation aids.

As hydratable inorganic compounds may be employed in principle all those described for stabilizing peracid compounds. As examples of such compounds may be mentioned sodium acetate, sodium perborate, zinc nitrate, sodium sulphate, magnesium sulphate, magnesium nitrate, lithium bromide, sodium phosphite, sodium hydrogen phosphite, and mixtures thereof.

The bleaching compositions of the present invention may be employed in detergents in the manner disclosed in U.S. Pat. No. 4,170,453, the disclosure of which is hereby incorporated by reference. Particularly when the bleaching granules are used in detergents, preference is given to sodium sulphate, since it shows no disadvantageous effects with regard to water hardness, environmental pollution, washing activity and it is a relatively inexpensive material.

Preferred bleaching compositions made by the present invention will contain 5–60 wt. % peroxy acid, 35–95 wt. % of the hydratable inorganic material and, optionally, up to 10 wt. % of a surface-active material and up to 15 wt. % of a water-insoluble organic compound in the form of an agglomerate with the peroxy acid.

The process according to the invention and the advantageous properties of the bleaching granules according to the invention will be further illustrated in the following examples.

Example 1

Charged into an Eirich mixer were 1200 g of an agglomerate of DPDA and lauric acid (lauric acid:DPDA weight ratio 1:3) in filter cake form (water content 28.1%). Subsequently, there were added 28.3 g of a 10%-solution of Dequest 2010 and 71.8 g of sodium dodecyl benzene sulphonate, and the whole was mixed at 450 rpm and ambient temperature. After 1896 g of powdered anhydrous sodium sulphate had been added, the whole was mixed at 48 rpm of the vessel and 450 rpm of the rotator at 30° C. until a crumbly, dry powder had formed. The mixing process was continued at stirring rates of 48 rpm for the vessel and 1500 rpm for the rotator, causing the temperature of the mixture to rise to about 33° C., at which temperature granules were formed. The size of the granules obtained was in the range of about 0.1 to about 2 mm. The granules were removed from the mixer, spread on a sheet, and left to cool for 10 minutes to about 25° C. In a subsequent screening step the granules were reduced to a size of about 1.5 mm and dried overnight in a drier at 40° C. In addition, the granules were incorporated into a detergent composition to determine the storage stability thereof.

The properties of the granules were examined. The results obtained are summarized in Table 1.

Example 2

In this Example granules were formed in an ALMA ® extruder with a discharge outlet of 1.5 mm in diameter.

A crumbly, dry powder was prepared from 1200 g of DPDA and lauric acid filter cake (DPDA:lauric acid weight ratio 3:1; water content 28.7%), 2.83 g of Dequest 2010, 85.0 g of sodium dodecyl benzene sulphonate, and 1883.2 g of powdered anhydrous sodium sulphate, as described in Example 1. After having been precooled to about 10° C., the powder was charged into the extruder and extruded, during which process the temperature of the mass increased to about 33° C.

On leaving the extruder the elongated extrudates formed had a temperature of about 32° C. After having been left to cool to ambient temperature, granules of the desired size distribution were prepared by a milling-screening step carried out in a machine for size reduction (trade mark Frewitt). The granules were examined with respect to their properties. The results are summarized in Table 1.

TABLE 1

| | Granules Example 1 | Granules Example 2 |
|---|---|---|
| Active oxygen content | | |
| calculated | 2.6% by weight | 2.6% by weight |
| determined after formation into granules | 2.6% by weight | 2.6% by weight |
| density[1)] | 730 kg/m$^3$ | 700 kg/m$^3$ |
| attrition[2)] | 4% by weight | 3% by weight |
| dissolving time in water[3)] | 2.0 min | 2.5 min |
| storage stability | 85% | 94% |

TABLE 1-continued

| | Granules Example 1 | Granules Example 2 |
|---|---|---|
| (expressed as active oxygen residual) | | |
| granules: 4 weeks/40° C. | | |
| granulate-detergent mixtures | | |
| 4 weeks/30° C./ 60% rel. humidity | 87% | n.d. |
| 5 weeks/37° C./ 32% rel. humidity | 74% | n.d. |

[1)]determined on granules of 0.4–1.5 mm
[2)]The attrition determined on granules of 0.5–1.0 mm in accordance with a modification of ISO Test No. 5937, use being made of a wire-mesh screen with a mesh size of 0.063 mm and the granules being whirled up for 20 minutes by an air stream of about 20 l/min. The attrition is expressed by the proportion by weight of material passing through an 0.5 mm mesh.
[3)]The dissolving time is expressed by the neutralization rate of a dispersion of 300 mg of granulate in 150 ml of water at 40° C. and a pH of 9.5, in which process the insoluble peracid was converted into its soluble neutralized salt. The neutralization process was followed by measuring the amount of an 0.1 N NaOH solution to be added to maintain a constant pH value of 9.5 with a Metrohm 632 pH measuring device. The dissolving time is defined as the time required for the neutralization of half of the granulate used (½).
n.d.) not determined.

Example 3 (Comparative Example)

a) Into an Eirich mixer (RTM), type RV 02 preheated to ambient temperature were charged 1255 g of filter cake (water content 26.4% by weight) of a DPDA/-lauric acid agglomerate (DPdA:lauric acid weight ration 3:1). After having been heated to 30°–40° C., 1700 g of anhydrous sodium sulphate were added, and the whole was stirred for 5 minutes at a stirring rate of the mixing vessel of 48 rpm. The stirring rate of the rotator was increased from 0 to 1800 rpm and the temperature of the reaction mass was found to be 30°–40° C. Subsequently, the mass was formed into granules. After 5 minutes the granules were discharged, cooled slowly, and then dried.

b) The test was repeated using 628 g of DPDA/lauric acid filter cake and 2163 g of anhydrous sodium sulphate.

Table 2 gives the test results for the granules obtained in the tests 3*a*) and 3*b*).

TABLE 2

| | Granules Test a) | Granules Test b) |
|---|---|---|
| granule strength | acceptable | acceptable |
| density | 750 kg/m$^3$ | 940 kg/m$^3$ |
| active oxygen content | | |
| calculated | 3.0% by weight | 1.5% by weight |
| determined after formation into granules | 2.75% by weight | 1.3% by weight |
| dissolving time in water | 10 minutes | 10 minutes |

Although this process produced granules of favourable quality in terms of density and strength, it was hampered by a substantial increase in dissolving time.

Example 4 (Comparative Example)

In this test the granulation was carried out as mixing agglomeration in an agitation apparatus called a pilot spray mixer manufactured by Telschig. This example is a comparison of the process of EP 0 200 163 to the process of the present invention and clearly demonstrates that for the process of EP 0 200 163 a binding agent or polymeric binding material is critical. The reaction vessel was charged with 1883 g of filter cake (water content 28.0% by weight) of a DPDA/lauric acid agglomerate (DPDA:lauric acid weight ratio 3:1), and 2550 g of anhydrous sodium sulphate. The mixture was heated to 33°–40° C. After 100 g of water preheated to 60° C. had been sprayed in, granulation took place in two minutes. The resulting granules were spread on a sheet, cooled, hardened, and vacuum-dried. The dry granules did not display any mechanical strength and in practical use displayed insufficient stability and an unacceptable high level of dust formation.

Example 5 (Example of scaled up operation)

This example is to demonstrate the feasibility of the novel technique when used in equipment of commercial scale.

The novel technique was tested in the high shear mixer DIOSNA ® type 100 V. The mixer is composed of a circular and conical reaction vessel, the bottom provided with three horizontally agitating blades, driven by a 3.7 or 4.4 KW motor, the side wall is provided with chopping cross wheels powdered by 3.0 or 4.0 KW.

Charged into the mixer were 25.00 kg of centrifuge cake of DPDA/lauric acid (ratio 3/1, Active oxygen content 5.78%, $H_2O$ content 30.5%) at a temperature of 12° C. The other raw materials were all added at ambient temperature. 2.31 kg of a 50% linear alkyl benzene sulphonate ("LAS") paste and 0.58 kg of a 10% Dequest 2010 solution were charged while operating the 4.4 KW agitating blades. The mixture was changed into a paste at 10° C. by 2 minutes of agitation.

Next, the machine conditions were changed to 3.7 KW for the agglomerator and 4 KW for the chopper and 39.20 kg of fine sodium sulfate powder was dosed over a period of 30 sec. It was observed that the content was changed into a fine powder having a temperature of 31° C. after two minutes.

Green granules were formed in the next 70 seconds using the conditions 4.4 KW for the agglomerator wheel and 3 KW for the chopper.

The contents were dumped and dried in a fluid bed.

The particle size distribution of the sample taken from the granulator when the granulation process was finished was as follows:

| | |
|---|---|
| <0.2 mm | 5% |
| 0.2–0.4 mm | 17% |
| 0.4–0.8 mm | 34% |
| 0.8–1.6 mm | 34% |
| >1.6 mm | 10% |

The properties of the final granules of this run and the products from examples 1 and 2 are similar.

Example 6 (Comparative Example)

This example demonstrates that the presence of peroxy acid particles is required for the formation of granules by the process of the invention.

Charged into the high shear mixer DIOSNAO type 100 V were 30.0 kg of fine sodium sulfate at 19° C. The 3.7 KW motor was started. 5.0 kg of water was admixed in about 10 seconds. The content of the mixer changed into a doughy mass with a temperature of 32.5° C. after 90 seconds of mixing. The formation of an intermediate phase of granules was not observed.

The time until formation of the doughy phase could be extended by admixing a solution of sodium sulfate or by admixing ice but these alterations failed to produce granules as the bulk phase of the content, prior to the doughy phase.

The reduction of the amount of liquid to 4. 7 kg did prevent the formation of dough upon passing the melting temperature of gleuber salt but no particle size enlargement occurred.

Examples 7–9 demonstrate the feasibility and advantage of bleach granules of the current invention comprised of peroxy acids other than DPDA.

Example 7 (6-phthalimido peroxy hexanoic acid (PAP) as peroxy acid)

Charged into an Eirich mixer were 430 g of an agglomerate of PAP and lauric acid (lauric acid: PAP weight ratio 1:3 in filter cake form, water content 38.9%) and 266 g of completely dry PAP/lauric acid cake. Subsequently, there were added 10.7 g of a 50% paste of sodium dodecyl benzene sulphonate and the whole was mixed at 450 rpm and ambient temperature until a paste was formed. After 119 g of fine anhydrous sodium sulfate had been added, the whole was mixed at 48 rpm of the vessel and 450 rpm of the rotator at 30° C. granules were formed.

The size of the granules obtained was in the range of about 1 mm to 2.0 mm.

The foregoing examples have been presented for the purposes of illustration and description only and are not to be construed as limiting the scope of the invention in any way. The scope of the invention is to be determined by the claims appended hereto.

Example 8 (4-nonylamino-4-oxy peroxy butanoic acid (NAPSA) as peroxy acid)

Example 8A

Charged into an Eirich mixer were 600 g NAPSA centrifuge cake (68 wt. % solid), 180 g boric acid, 78 g (80% active) powdered, spray-dried linear alkyl benzene sulphonate (LAS) (alkyl chain length $C_{12-13}$), and 2 g sodium diphosphate. These ingredients were mixed intensively until a paste formed (2 minutes). Subsequently 900 g of milled sodium sulfate were added to the Eirich mixer. Within 3 minutes the temperature of the mixture rose from room temperature to 33° C. and the consistency changed from fine powder to crumbly powder to granules.

Example 8B

In a parallel experiment, the fine powder product of the Eirich mixer (residence time about one minute) was fed to an Alma extruder. The powdery feed was cooled to room temperature prior to extrusion. The temperature of the green extradates leaving the Alma extruder was 30° C. The green extradates were dried and sieved.

The product properties for Example 8A and Example 8B follow.

| | 8A | 8B |
|---|---|---|
| Yield (0.1 to 2 mm) | 88 wt. % | 95 wt. % |
| Attrition | 3 wt. % | 2 wt. % |
| Solubility | 0.9 min. | 0.8 min. |
| Bulk density | 750 kg/m$^3$ | 750 kg/m$^3$ |

Example 9 (6-nonylamino-6-oxoperoxyhexanoic acid (NAPAA) as peroxy acid)

The following process was employed to produce 1 kg of bleach granules comprised of 55 wt. % technical grade NAPAA, LAS, minor amounts of stabilizing agent and sodium sulfate.

As a first step 146 g NAPAA pressed filter cake, with a moisture content of 56%, 441 g dried NAPAA and 88 g LAS (as 50% paste) were added to a Lödige M5R mixer and treated for 6 minutes at 200 rpm until a dough formed. As a second step, 325 g sodium sulfate powder was admixed at 200 rpm until a coarse powder formed (6 minutes). The product was then placed in an Alma meat mincer having 1 mm holes. Proper extrudates were formed I minute after extrusion began. The extrusion took 8 minutes. The product temperature reached 33° C. The extrudate was dried in a Buchi 710 fluid bed dryer with 60° C. drying air for 20 minutes. The bed temperature rose from 24° C. to 40° C. The residual moisture content was a low 0.2 wt %. After crushing and sieving in a Frewitt apparatus, 90% yield in the 0.2 to 1.2 mm range was achieved.

The resulting bleach granules easily disintegrate upon addition of distilled water producing an opaque dispersion without visible lumps, The particles were 95 and 100% smaller than 32 and 64 μm respectively.

The product properties follow.

| | |
|---|---|
| Attrition | 6 wt. % |
| Solubility (t ½) | 1.2 min. |
| Bulk density | 580 kg/m$^3$ |
| Porosity (Mercury) | 330 ml/kg |

We claim:

1. Solid, free-flowing bleaching granules produced by mixing at least one water-insoluble peroxy acid compound and a hydratable inorganic material at a total water content which is below the maximum hydration water content of the hydratable inorganic material and at a temperature which is below the hydration temperature of the hydratable inorganic material, until a powder is formed, raising the temperature of the resulting powder to at least the hydration temperature of the hydratable inorganic material and subsequently forming said powder into granules, wherein said granules have a size distribution range of 0.1 to 5 mm, said granules comprised of 5–60 wt. % peroxy acid, 35–95 wt. % hydratable inorganic material, up to 10 wt. % of a surface-active material, and up to 15 wt. % of a water insoluble organic compound, with the proviso that said granules do not contain a polymeric granulation aid.

2. The bleaching composition according to claim 1 wherein said surface-active material is linear alkyl benzene sulphonate and said water insoluble organic compound is lauric acid.

3. The bleaching granules of claim 1 wherein said peroxyacid is selected from the group consisting of 1,9-diperoxy nonanedioc acid; 1,12-diperoxy dodecanediocic acid; 1,13-diperoxytridecanedioc acid; N-decanoyol-6-aminoperoxyhexanoic acid; N-dodecanoyl-6-aminoperoxyhexanoic acid; 4-nonylamino-4-oxoperoxybutanoic acid; 6-nonylamino-6-oxoperoxyhexanoic acid; alkyl-sulphonyl peroxycarboxylic acids, perphthalimido alkanoic acids and mixtures thereof.

4. The bleaching granules of claim 1 wherein said bleaching granules are comprised of 5–60 wt. % peroxy acid, 35–95 wt. % sodium sulphate, and further comprising up to 10 wt. % linear alkyl benzene sulphonate, and up to 15 wt. % lauric acid.

5. The bleaching granules of claim 1 which comprises a surface active material.

6. The bleaching granules of claim 5 wherein said surface active agent is a linear alkyl benzene sulphonate.

7. The bleaching granules of claim 5 which additionally comprises a water-insoluble organic compound.

8. The bleaching granules of claim 7 wherein said water-soluble organic compound is chosen from the group consisting of lauric acid, myristic acid and mixtures thereof.

9. A detergent composition comprised of at least one surfactant and the bleaching granules of claim 5.

* * * * *